United States Patent
Goff et al.

(10) Patent No.: US 7,627,869 B2
(45) Date of Patent: Dec. 1, 2009

(54) HARDWARE REGISTER ACCESS VIA TASK TAG ID

(75) Inventors: Lonnie Goff, Tempe, AZ (US); Gabriel R. Munguia, Phoenix, AZ (US); Brian Logsdon, Chandler, AZ (US)

(73) Assignee: NXP B.V., Eindhoven (NL)

( * ) Notice: Subject to any disclaimer, the term of this patent is extended or adjusted under 35 U.S.C. 154(b) by 0 days.

(21) Appl. No.: 10/568,556

(22) PCT Filed: Aug. 20, 2004

(86) PCT No.: PCT/IB2004/051519

§ 371 (c)(1),
(2), (4) Date: Apr. 23, 2008

(87) PCT Pub. No.: WO2005/020111

PCT Pub. Date: Mar. 3, 2005

(65) Prior Publication Data

US 2008/0209427 A1    Aug. 28, 2008

Related U.S. Application Data

(60) Provisional application No. 60/496,958, filed on Aug. 21, 2003.

(51) Int. Cl.
*G06F 9/46* (2006.01)
(52) U.S. Cl. .................... 718/104; 718/100
(58) Field of Classification Search .............. 718/100, 718/102, 104; 712/231
See application file for complete search history.

(56) References Cited

U.S. PATENT DOCUMENTS

| | | | | |
|---|---|---|---|---|
| 4,123,795 A * | 10/1978 | Dean et al. | .............. | 718/103 |
| 4,493,020 A * | 1/1985 | Kim et al. | .............. | 712/217 |
| 4,542,455 A * | 9/1985 | Demeure | .............. | 718/104 |
| 4,829,425 A * | 5/1989 | Bain et al. | .............. | 711/202 |
| 5,414,864 A * | 5/1995 | Koizumi | .............. | 712/228 |
| 5,434,970 A * | 7/1995 | Schiffleger | .............. | 709/213 |
| 5,867,417 A * | 2/1999 | Wallace et al. | .............. | 365/52 |
| 6,112,273 A * | 8/2000 | Kau et al. | .............. | 710/260 |
| 6,233,599 B1 * | 5/2001 | Nation et al. | .............. | 718/102 |
| 6,253,273 B1 * | 6/2001 | Blumenau | .............. | 710/200 |
| 6,314,486 B1 * | 11/2001 | Schulz et al. | .............. | 710/310 |
| 6,330,612 B1 * | 12/2001 | Boonie et al. | .............. | 709/229 |
| 6,434,034 B1 * | 8/2002 | Wallace et al. | .............. | 365/52 |
| 6,434,642 B1 * | 8/2002 | Camilleri et al. | .............. | 710/57 |
| 6,628,537 B1 * | 9/2003 | Wallace et al. | .............. | 365/52 |
| 7,246,202 B2 * | 7/2007 | Morishita et al. | .............. | 711/129 |
| 7,376,954 B2 * | 5/2008 | Kissell | .............. | 718/107 |

(Continued)

OTHER PUBLICATIONS

Halstead et al. ("MASA: A multithreaded processor Architecture for parallel symbolic computing", IEEE, 1988, pp. 443-451).*
Mahon et al., "Hewlett-packard precision architecture: the processor", Hwelett-packard journal, Aug. 1986, pp. 4-21.*

*Primary Examiner*—Meng-Ai An
*Assistant Examiner*—Caroline Arcos

(57) ABSTRACT

A computer-based software task management system includes an index register configured to store a data register pointer for pointing to a data register. A Task ID register is coupled to the index register and configured to store a Task ID keyed to the index register. A Task ID memory is coupled to the Task ID register and configured to store a flag indicating whether the Task ID is available. A state machine is coupled to the Task ID memory and configured to allocate Task IDs on an available basis using a task ID memory.

6 Claims, 4 Drawing Sheets

U.S. PATENT DOCUMENTS

| | | | |
|---|---|---|---|
| 7,421,694 B2* | 9/2008 | Gosalia et al. | 718/104 |
| 7,424,622 B2* | 9/2008 | Hashimoto et al. | 713/194 |
| 7,444,634 B2* | 10/2008 | Jeyaram | 718/104 |
| 2002/0078124 A1* | 6/2002 | Baylor et al. | 709/106 |
| 2003/0041036 A1* | 2/2003 | Molinari et al. | 705/77 |
| 2004/0139341 A1* | 7/2004 | Yamaguchi et al. | 713/194 |

* cited by examiner

HARDWARE REGISTER ACCESS VIA TASK TAG ID

CROSS REFERENCE TO RELATED APPLICATION

This application claims the benefit of U.S. provisional application Ser. No. 60/496,958 filed Aug. 21, 2003, which is incorporated herein whole by reference.

The present invention relates to the general field of computer systems and more particularly to the field of task switching in an operating system.

In conventional operating systems, there is a one-to-one relationship between the task and the program, but some operating systems support multiple programs running simultaneously, or allow a program to be divided into multiple tasks. Operating systems that allow these operations are called multithreading operating systems. Multithreading is the ability of an operating system to track and manage multiple tasks simultaneously. In a multithreading operating system, each task is tracked as a thread with a separate identity.

When a task switch occurs, conflicts over the ownership of index registers being used to track and perform the tasks often arise. At present, special techniques are required to resolve these ownership conflicts. One common technique for resolving ownership conflicts involves requiring all of the software modules that access an index register to block task switching. Once task switching is blocked, the index register is programmed and a data register specified by the index register is accessed. Task switching is then unblocked. This task switch blocking strategy does not work well for all operating environments. For example, the blocking strategy will not work in multiprocessor environments. Additionally, even in those environments that permit task switch blocking, task switch blocking forces all software modules in the system to replicate the same strategy. Replication of the task switch blocking strategy by all software modules is inefficient and error prone.

Another approach to resolving ownership conflicts is to implement a resource-locking scheme. In the resource-locking scheme, the first task to grab a resource lock owns the index register related to the resource lock until the first task relinquishes the grabbed resource lock. Other tasks that need to use the same resource lock are effectively idled, thereby creating a bottleneck. The resource-locking approach, therefore, is very inefficient. Additionally, the resource-locking approach is difficult to implement in multi-processor environments.

Therefore, an efficient method for resolving index register ownership conflicts that can be used in multi-processor environments is needed.

The invention overcomes the identified limitations and provides a technique for tracking and managing tasks in a multithreaded operating system.

A computer-based software task management system includes an index register configured to store a data register pointer for pointing to a data register. A Task ID register is coupled to the index register and configured to store a Task ID keyed to the index register. A Task ID memory is coupled to the Task ID register and configured to store a flag indicating whether the Task ID is available. A state machine is coupled to the Task ID memory and configured to allocate Task IDs on an available basis using a Task ID memory. In one embodiment, the state machine is configured (a) to receive a Task ID request from a task, (b) to determine whether a Task ID is available in response to the Task ID request, (c) when a Task ID is available, to issue a Task ID to the task and set the flag in the Task ID memory indicating that the Task ID is in use, and (d) when the task is complete, to reset the flag in the Task ID memory indicating that the Task ID is available. If a Task ID is not available, the task can periodically request a Task ID until one is granted.

In one aspect of the invention using a plurality of index registers, each index register is uniquely associated with a different Task ID.

In one aspect of the invention, a flip-flop circuit is coupled to the index register and configured to cause the task to alternate between a write cycle to the index register and a read or write cycle to the data register addressed by the index register.

The invention permits multiple tasks running on either single or multiple central processing units (CPUs) to access an index register/data register combination without interference and without using resource-locking or task switch blocking. Because the invention uses multiple index registers, tasks do not need to wait for permission to write a single index register while another task uses the same index register. Collisions in the index register are thereby reduced. Further, the content of the index registers may be preserved for use by the related tasks. An additional advantage of the invention is that it requires virtually no additional software overhead.

The invention is described with reference to the following figures.

The invention is described with reference to specific apparatus and embodiments. Those skilled in the art will recognize that the description is for illustration and to provide the best mode of practicing the invention.

Figure 1:
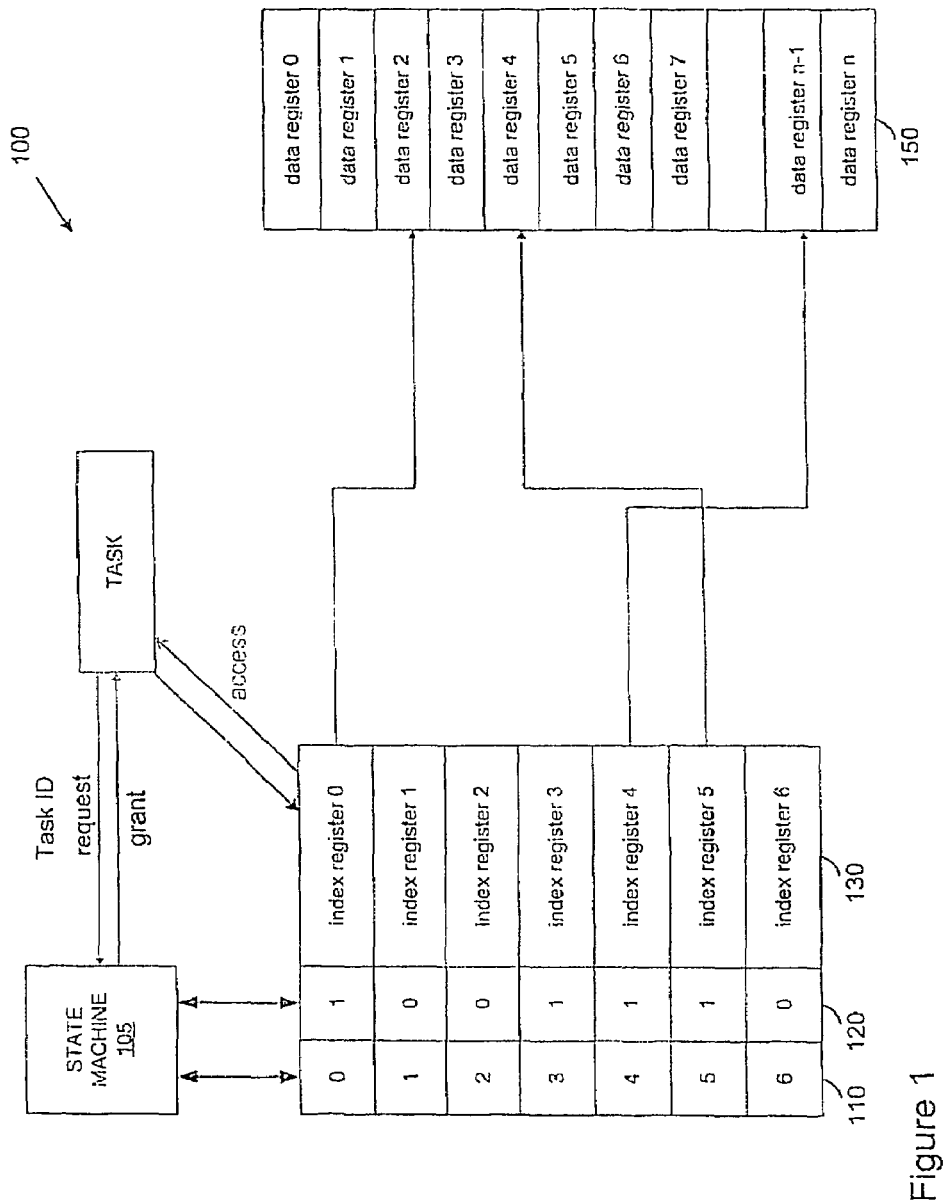
FIG. 1 is a logical depiction showing a task management system in block diagram form, according to an embodiment of the invention.

FIG. 1 is a logical depiction showing a task management system 100 (management system). The management system includes a Task ID state machine 105 (state machine), a Task ID register 110, a Task ID memory 120 (Task ID flags), an index register 130 (hardware register), and data registers 150 (e.g. main memory).

As shown in the top left corner of FIG. 1, a task requests a Task ID from the state machine, which can then grant a Task ID as described below. In this context, a task is an operating system concept that refers to the combination of a program being executed and other attributing information used by the operating system. Whenever a program is executed, the operating system may create a new task. Typically, the task identifies the program with a task number, which may also be associated with other runtime attributes.

In response to the request for a Task ID from the task, the state machine, in turn, may grant a Task ID to the task. The index register may include a plurality of individual index registers (bank of index registers). Each Task ID (Task Tag ID) is uniquely associated with an individual index register. The Task IDs assist in locating available index registers. Thus, when a task is granted a Task ID, the task uses the Task ID to access the related index register and to perform the task.

The Task ID register is coupled to the Task ID memory, and the state machine. The exemplary Task ID register depicted in FIG. 1 includes seven Task IDs numbered 0-6. As described above, each Task ID is uniquely associated to a particular index register. The index registers store index register data. The index register data may include, for example, memory pointers to point to the data registers, as will be described further below with reference to FIG. 1. In an alternate embodiment of the invention, another type of hardware register other than an index register is used. The exemplary index register depicted in FIG. 1 includes seven index registers numbered 0-6.

The Task ID memory 120 is coupled to the Task ID register 110, the index register 130, and the state machine 105. The Task ID memory is, in one aspect of the invention, an array of flags that indicate whether or not a Task ID from the Task ID register is available. The state machine accesses the Task ID memory to determine what Task IDs are available. The Task ID memory may be an array of 1-bit flags, such that an entry of "0" in the Task ID memory indicates that the corresponding Task ID in the Task ID register is available. Conversely, a "1" in the Task ID memory may indicate that the corresponding Task ID is not available. The exemplary Task ID memory depicted in FIG. 1 is a 1-bit array having seven entries.

The state machine is coupled to the Task ID memory and the Task ID register. As described above, the state machine receives a Task ID request from a task. In response to the Task ID request, the state machine issues a query to the Task ID memory to determine which, if any, of the Task IDs in the Task ID register are available. In one aspect of the invention, the Task ID memory responds to the query from the state machine by sending a Task ID memory signal to the state machine. The Task ID memory signal includes status information pertaining to at least one of the Task IDs. The state machine uses the status information contained in the Task ID memory signal to determine whether to grant a Task ID to the task. In one aspect of the invention, the state machine also determines which Task ID of available Task IDs to grant to the task in response to the Task ID memory signal.

As shown in FIG. 1, the index registers 130 are coupled to the data registers 150. As described above, the index registers contain pointers to various data registers. In one aspect of the invention, the data registers store data. In another aspect of the invention, the data registers store configuration and/or control information for use in performing the task.

Regarding the ownership of data registers, in one aspect of the invention the data registers are not allocated. That is, there is no memory allocation of data registers. The data registers may be hardwired into the index register path. Therefore, each data register is available for access by all software tasks (assuming that the task has been granted an index register). In this aspect, the software task knows who "owns" the right to access a particular data register through the use of a complex universal serial bus (USB) block. In the USB block there are clusters of data registers called endpoints. Each endpoint handles a different device. For example, one endpoint may handle a USB keyboard while another endpoint is used to pass data to a USB printer. It is "understood" that software written to communicate with the printer does not interfere with the keyboard's endpoint registers. In the context of USB blocks, the term "endpoint register" may be used interchangeably with the term "data register".

Data register content is not stored in an index registers. Index registers are utilized because there are not enough available addresses in the system design to permit each data register to have its own address. The data register accessed is determined by the content of the particular index register.

Referring to FIG. 1, an example of the operation of the management system follows. The state machine receives a Task ID request and responds by sending a query to the Task ID memory for Task ID status information. The Task ID memory responds to the query from the state machine by sending a Task ID memory signal to the state machine. The Task ID memory signal includes status information pertaining to at least one of the Task IDs in the Task ID register. For example, referring to FIG. 1, the status information returned may include notice that Task IDs 1, 2, and 6 are available, as indicated by the "0"s in the corresponding Task ID memory field. The state machine may use this status information to select a Task ID, for example Task ID 1. The state machine may then grant Task ID 1 to the task. The task then uses Task ID 1 to access the uniquely associated index register, index register 1. Index register 1, in turn, contains a pointer that points to a data register.

Figure 2:
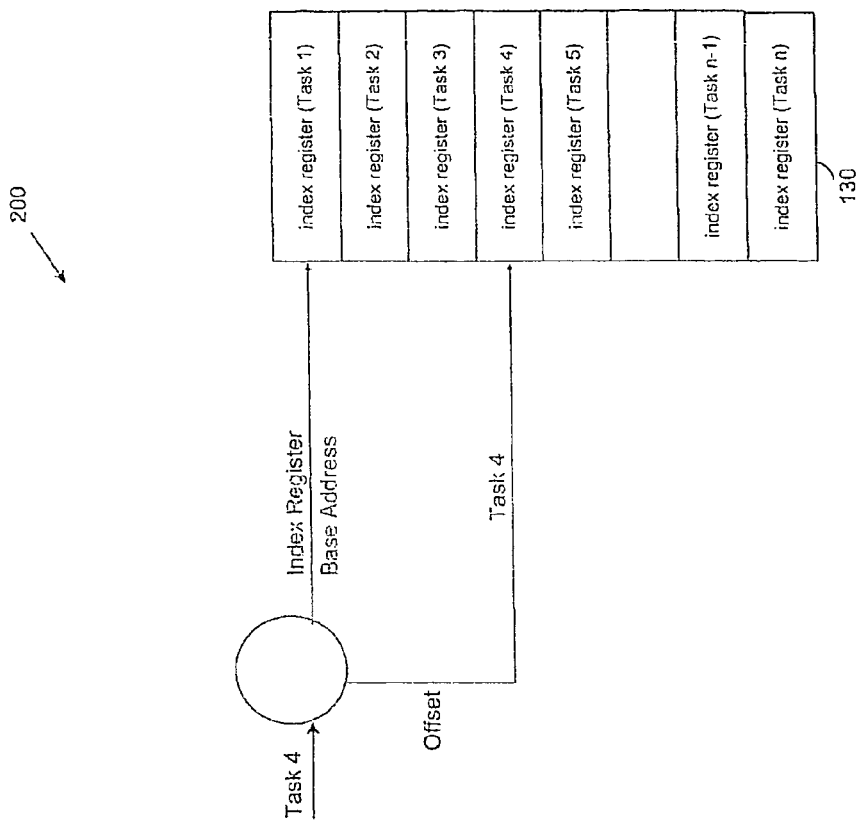
FIG. 2 is a logical depiction showing a task management system in block diagram form, according to another embodiment of the invention.

FIG. 2 is a logical depiction showing a task management system 200 in block diagram form, according to another embodiment of the invention. As described above with reference to FIG. 1, in one embodiment of the invention, the index register is expanded from a single register to a bank of registers. In this embodiment, the size of the bank may be configured to match the number of Task IDs supported by the Task ID register. To access the index register, data written to and read from the index register uses an offset and an index register base address. That is, where the index register base address is known, "adding" the offset to the index register base address accesses an index register for a particular task. The Task ID is used to define the offset.

Referring again to FIG. 2, the figure demonstrates how a particular index register is accessed using the index register base address and an offset. The index register base address is known and is associated with the "index register (Task 1)", as shown in the figure. When Task 4 needs to access an index register it uses its offset, defined by the Task ID, in addition to the index register base address to access the index register (Task 4), as also shown in the figure.

Figure 3:
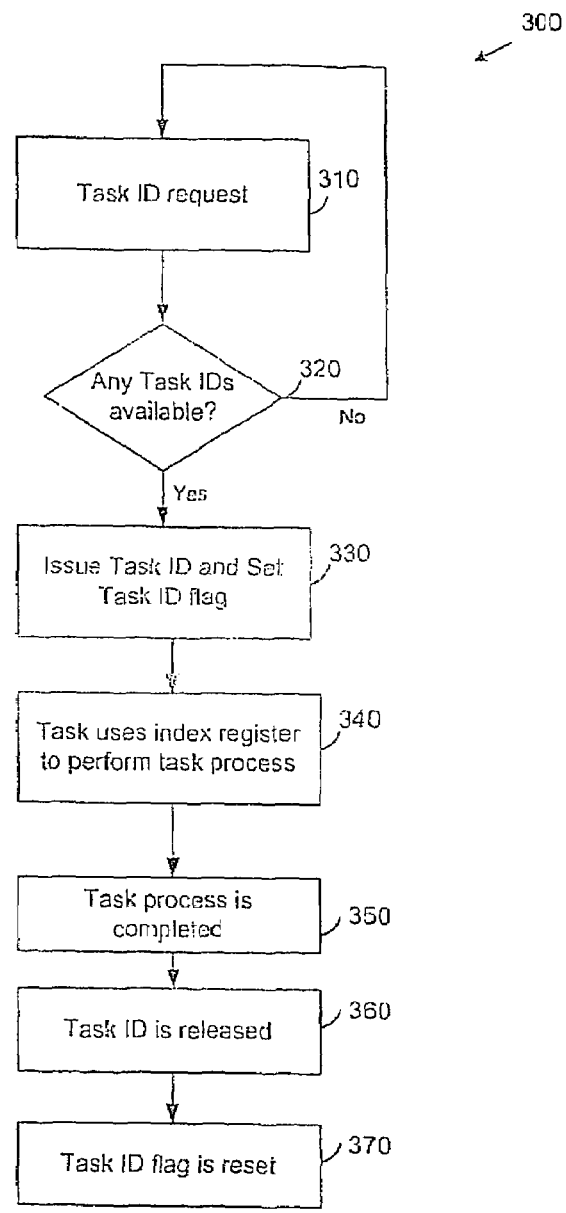
FIG. 3 is a flow diagram showing a method for managing multiple index registers among multiple tasks, according to an embodiment of the invention.

FIG. 3 is a flow diagram showing a method 300 for managing multiple index registers among multiple tasks, according to an embodiment of the invention. At step 310, a Task ID request is received from a task. At step 320, a determination is made as to whether any Task IDs are available in response to the Task ID request. If no Task IDs are available, then the process returns to step 310 to wait for another Task ID request to be received. If there is a Task ID available, then a Task ID is issued and a Task ID flag is set at step 330. The Task ID flag (Task ID memory) indicates whether or not a Task ID is available. At step 340, the task uses the index register that is uniquely associated with the issued Task ID to execute the task. At step 350, the task is completed. At step 360, the issued Task ID is released to be used by another task in response to completion of the task. At step 370, the Task ID flag is reset in response to the release of the issued Task ID.

Figure 4:
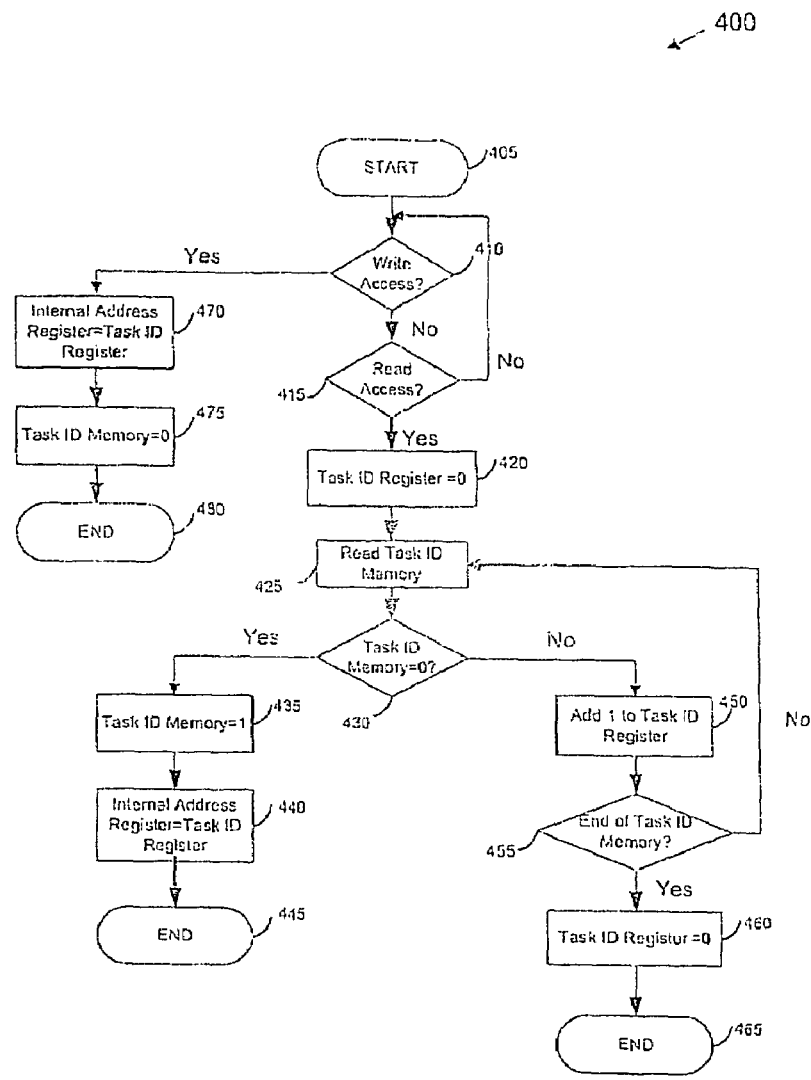
FIG. 4 is a flow diagram showing a method for managing multiple index registers among multiple tasks, according to another embodiment of the invention.

FIG. 4 is a flow diagram showing a method 400 for managing multiple index registers among multiple tasks, according to another embodiment of the invention. At step 405, the process begins and the Task ID state machine waits for a read or write bus access of the Task ID Register. At step 410, a determination is made as to whether a write access has been received. If a write access has been received, then the process advances to step 470 where an internal address register (Task ID Memory Register) is loaded from the contents of the Task ID register. The Task ID written to the Task ID register, in effect, specifies the status location of the index register in memory. At step 475, the current Task ID is flagged 'available'. That is, the Task ID memory is set to zero. At step 380, the process ends.

Returning now to step 410, if a write access has not been received, then the process continues with step 415 where a determination is made as to whether a read access has been received. If a read access has not been received, then the process returns to step 405 to wait for a read or write bus access. If a read access has been received, a search for an available Task ID begins and at step 420 the Task ID register is set to zero. At step 425, the Task ID memory is read. At step 430, a determination is made as to whether the Task ID memory is equal to zero.

If the determination of step 430 finds that the Task ID memory is equal to zero, the corresponding Task ID is available and at step 435, the Task ID memory is set to 1. At step 440, the Task ID register is loaded from the contents of the internal address register. At step 445, the process ends.

Returning to step 430, if the Task ID memory is not equal to zero, then the corresponding Task ID is not available and at step 450 the Task ID register is increased by 1. At step 455, a determination is made as to whether the end of the Task ID memory has been reached. If the end of the Task ID memory has not been reached, then the process returns to step 425 to read the Task ID memory. If the end of the Task ID memory has been reached, then at step 460 the Task ID register is set to zero. At step 465, the process ends.

In one aspect of the invention, an internal access "flip-flop" toggle technique is used. In one aspect of the invention, the flip-flop toggle technique is implemented using a flip-flop circuit. In using the flip-flop technique, the first read or write access (read or write cycle) is steered to the index register. The next read or write access is steered to the data register. The next read or write access is steered to the index register, and so on. Additionally, the flip-flop toggle is reset on any read cycle. In one aspect of the invention, the first access is always a write to the index register. The next access to the index register is steered to the data register addressed by the index register. This second access may be either a read or write.

The flip-flop toggle technique removes the need to assign a bus address to the collection of data registers. This is especially advantageous because multiple index registers are used. Thus, for example, rather than assigning ten additional data register addresses where ten index registers are used, there is no need to assign any data register addresses.

Additional advantages include that the invention permits multiple tasks running on either single or multiple central processing units (CPUs) to access an index register/data register combination without interference and without using resource-locking or task switch blocking. Because the invention uses multiple index registers, tasks do not need to wait for permission to write a single index register while another task uses the same index register. Collisions in the index register are thereby reduced. Further, the content of the index registers may be preserved for use by the related tasks. An additional advantage of the invention is that it requires virtually no additional software overhead. Also, due to the use of Task IDs, address space on the bus is saved without sacrificing system integrity.

Having disclosed exemplary embodiments and the best mode, modifications and variations may be made to the disclosed embodiments while remaining within the subject and spirit of the invention as defined by the following claims.

What is claimed is:

1. A computer-based software task management system comprising:
    a Task ID register for storing a plurality of different Task IDs;
    a plurality of index registers, each associated with a corresponding one of the Task IDs, each index register configured to store a data register pointer for pointing to a data register;
    a Task ID memory coupled to the Task ID register and configured to store a plurality of flags, each flag associated with a corresponding one of the Task IDs and each indicating whether the corresponding Task ID is available;
    a state machine coupled to the Task ID memory and configured to (a) receive a Task ID request from a task, (b) to determine whether a Task ID is available in response to the Task ID request, (c) when a Task ID is available, to issue the Task ID to the task and set the flag in the Task ID memory indicating that the Task ID is in use, and (d) when the task is complete, to reset the flag in the Task ID memory indicating that the Task ID is available;
    wherein the Task ID register comprises a plurality of Task ID registers each configured to store one of said Task IDs;
    wherein the Task ID memory comprises a plurality of Task ID memories, each storing one of said plurality of flags each coupled to the Task;
    wherein the state machine is configured to manage a plurality of tasks with the plurality of index registers, Task ID registers and the Task ID memory;
    wherein a flip-flop circuit is coupled to each index register and is configured to toggle in response to each instance of the task, to cause the task to alternate between a write cycle to the index register and one selected from the group consisting of: a write cycle to the data register pointed to by the index register and a read cycle to the data register pointer to by the index register.

2. The computer-based software task management system of claim 1, wherein each said index register is uniquely associated with a different Task ID.

3. A computer-implemented method for managing multiple tasks using a state machine coupled to a Task ID memory having a plurality of Task ID memories, coupled to a plurality of Task ID registers, each of the Task ID registers configured to store one of a plurality of Task IDs, and a plurality of index registers, each an index register associated with a corresponding Task ID and configured to store a data register pointer for pointing to a data register, comprising:
    storing one of a plurality of flags in each of the Task ID memories, each flag associated with the Task ID stored by the Task ID register coupled to the Task ID memory;
    receiving a Task ID request from a task at the state machine;
    determining whether a Task ID is available for the Task ID request, said determining comprising reading the flags stored in the Task ID memory in response to the Task ID request to determine, based on the flags, whether a Task ID is available for the Task ID request;
    in response to said determining that said Task ID is available, issuing said Task ID to the task and setting the flag associated with the issued Task ID in the Task ID memory to indicate that the Task ID is in use;
    detecting when the task having the issued Task ID is complete and, in response, resetting the flag associated with said Task ID in the Task ID memory to indicate that the Task ID is available; and
    alternating a read/write flip flop toggle in response to each instance of the task, causing the task to alternate between a write cycle to the index register and one selected from the group consisting of: a write cycle to the data register pointed to by the index register; and a read cycle to the data register pointed to by the index register.

4. The computer-implemented method of claim 3, further comprising: in response to the determining the Task ID is not available, periodically requesting the Task ID.

5. The computer-implemented method of claim 3, further comprising:

resetting the read/write flip-flop after each read-cycle, the flip-flop steering the read and write accesses to the index register and the data register pointed to by the index register.

6. The computer-implemented method of claim 4, further comprising: resetting the read/write flip-flop after each read-cycle, the read/write flip-flop steering the read and write accesses to the index register and the data register pointed to by the index register.

* * * * *